United States Patent
Yazdandoost et al.

(10) Patent No.: US 10,061,963 B2
(45) Date of Patent: *Aug. 28, 2018

(54) ACTIVE SENSING ELEMENT FOR ACOUSTIC IMAGING SYSTEMS

(71) Applicant: Apple Inc., Cupertino, CA (US)

(72) Inventors: Mohammad Yeke Yazdandoost, San Jose, CA (US); Giovanni Gozzini, Berkeley, CA (US); Jean-Marie Bussat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,639

(22) Filed: Aug. 28, 2017

(65) Prior Publication Data

US 2017/0357839 A1 Dec. 14, 2017

Related U.S. Application Data

(63) Continuation of application No. 14/823,945, filed on Aug. 11, 2015, now Pat. No. 9,747,488.

(60) Provisional application No. 62/057,921, filed on Sep. 30, 2014.

(51) Int. Cl.
G06K 9/28 (2006.01)
G06K 9/00 (2006.01)

(52) U.S. Cl.
CPC .................. G06K 9/0002 (2013.01)

(58) Field of Classification Search
CPC ...... G06K 9/00013–2009/0006; G06K 9/0002
See application file for complete search history.

(56) References Cited

U.S. PATENT DOCUMENTS

| | | | |
|---|---|---|---|
| 4,729,128 A | 3/1988 | Grimes | |
| 5,162,618 A | 11/1992 | Knowles | |
| 5,381,696 A * | 1/1995 | Ichinose | G01D 5/18 73/771 |
| 5,515,298 A | 5/1996 | Bicz | |
| 5,589,636 A | 12/1996 | Bicz | |
| 5,719,950 A | 2/1998 | Osten | |
| 5,886,452 A | 3/1999 | Toda | |
| 6,091,406 A | 7/2000 | Kambara | |
| 6,159,149 A | 12/2000 | Erikson | |
| 6,164,135 A | 12/2000 | Bicz | |
| 6,720,712 B2 | 4/2004 | Scott | |
| 7,032,454 B2 | 4/2006 | Amano | |
| 7,400,750 B2 | 7/2008 | Nam | |
| 7,458,268 B2 | 12/2008 | Schneider et al. | |
| 7,497,120 B2 | 3/2009 | Schneider et al. | |
| 7,568,391 B2 | 8/2009 | Schneider et al. | |

(Continued)

FOREIGN PATENT DOCUMENTS

WO    WO 94/002911    2/1994

*Primary Examiner* — Brian Werner
(74) *Attorney, Agent, or Firm* — Brownstein Hyatt Farber Schreck, LLP

(57) ABSTRACT

An acoustic fingerprint imaging system having a plurality of acoustic elements, each acoustic element including a transducer, and independent drive and sense circuitry is disclosed. Drive circuitry may require higher voltage than low voltage sense circuitry. Many embodiments described herein include a ground shifting controller to apply a voltage bias to the low voltage sense circuitry during a drive operation, in order to prevent electrical damage to the sense circuitry.

20 Claims, 6 Drawing Sheets

(56) References Cited

U.S. PATENT DOCUMENTS

| | | |
|---|---|---|
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,508,103 B2 | 8/2013 | Schmitt et al. |
| 8,536,465 B2 | 9/2013 | Hagiwara et al. |
| 8,576,202 B2 | 11/2013 | Tanaka et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,692,812 B2 | 4/2014 | Hecht |
| 8,724,869 B2 | 5/2014 | Schneider et al. |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,201,546 B2 | 12/2015 | Son et al. |
| 9,275,625 B2 | 3/2016 | Kim et al. |
| 9,323,393 B2 | 4/2016 | Djordjev et al. |
| 9,465,972 B2 | 10/2016 | Chung et al. |
| 9,568,315 B2 | 2/2017 | Naoka, II et al. |
| 9,607,203 B1 | 3/2017 | Yazdandoost et al. |
| 9,613,246 B1 | 4/2017 | Gozzini et al. |
| 9,778,193 B2 | 10/2017 | Vacca |
| 9,824,254 B1 | 11/2017 | Yazdandoost et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1 | 12/2004 | Polcha |
| 2006/0196271 A1 | 9/2006 | Jancsik et al. |
| 2008/0142571 A1 | 6/2008 | Yokozuka et al. |
| 2008/0175450 A1 | 7/2008 | Scott |
| 2009/0167704 A1 | 7/2009 | Terlizzi et al. |
| 2012/0092026 A1 | 4/2012 | Liautaud et al. |
| 2013/0015868 A1 | 1/2013 | Peng |
| 2013/0278111 A1 | 10/2013 | Sammoura et al. |
| 2014/0333328 A1 | 11/2014 | Nelson et al. |
| 2014/0352440 A1 | 12/2014 | Fennell et al. |
| 2014/0355381 A1 | 12/2014 | Lal et al. |
| 2014/0359757 A1 | 12/2014 | Sezan et al. |
| 2015/0053006 A1 | 2/2015 | DeCoux et al. |
| 2015/0185898 A1 | 7/2015 | Masson et al. |
| 2015/0192547 A1 | 7/2015 | Lee et al. |
| 2015/0358740 A1 | 12/2015 | Tsai et al. |
| 2016/0063300 A1 | 3/2016 | Du et al. |
| 2016/0092716 A1 | 3/2016 | Yazdandoost et al. |
| 2016/0117541 A1* | 4/2016 | Lu .................. G06K 9/0002 382/124 |
| 2016/0246396 A1 | 8/2016 | Dickinson et al. |
| 2016/0350573 A1 | 12/2016 | Kitchens, II et al. |

\* cited by examiner

ACTIVE SENSING ELEMENT FOR ACOUSTIC IMAGING SYSTEMS

CROSS-REFERENCE TO RELATED APPLICATIONS

This application is a continuation of U.S. patent application Ser. No. 14/823,945, filed Aug. 11, 2015, and titled "Active Sensing Element for Acoustic Imaging Systems," which is a nonprovisional patent application of, and claims the benefit to, U.S. Provisional Patent Application No. 62/057,921, filed Sep. 30, 2014, and titled "Active Pixel for Acoustic Imaging Systems," the disclosures of which are hereby incorporated by reference herein in their entirety.

FIELD

This disclosure relates generally to security features for electronic devices, and more particularly, to systems and methods for operating individual sensors of a segmented acoustic fingerprint imaging system.

BACKGROUND

Many electronic devices include security features to prevent unauthorized access. For example, an electronic device can include a biometric sensor configured to establish a user's identity by determining whether obtained biometric data matches known biometric data of an authorized user. A fingerprint imaging system is one example of a biometric sensor.

In many cases, the performance of a biometric sensor may be affected by the precision with which biometric data can be detected. Although increased precision may lead to improved security for the electronic device, it may also result in a physical reduction in the size of one or more components of the sensor. For example, a high-precision fingerprint imaging system may require smaller imaging sensors than low-precision imaging systems.

The quality of a signal obtained from physically smaller components is often negatively affected by the components' smaller size. For example, small imaging sensors may detect less image information than large imaging sensors, generating lower-amplitude signals that may be more sensitive to interference. In other cases, small imaging sensors may be more susceptible to signal distortion from environmental conditions (e.g., temperature, pressure, humidity, and so on) than larger imaging sensors.

To account for the lower signal quality that may be associated with smaller components, many biometric sensors may require advanced signal processing capability, which may undesirably increase power consumption and processing delays of the system. As a result, high-precision biometric sensors may be difficult to include within electronic devices having limited power and processing resources.

SUMMARY

Embodiments described herein take the form of a sensor of an acoustic fingerprint imaging system. The individual sensor can include both drive circuitry and sense circuitry. In many examples, the drive circuitry can be configured to operate at high voltage (e.g., 100 volts) and the sense circuitry can be configured to operate at low voltage (e.g., less than 5 volts). In many examples, a ground potential of the sense circuitry can be set to a high voltage during operation of the drive circuitry. In this manner, the low-voltage sense circuitry can be isolated from the high voltage drive circuitry.

Some embodiments described herein take the form of an imaging sensor for an acoustic fingerprint imaging system. The imaging sensor can include an array of individual sensors that each can be associated with a drive circuit and sense circuit. In many examples, the drive circuit of each individual sensor of the array of individual sensors can be configured to operate at high voltage (e.g., 100 volts) and the sense circuit of each individual sensor of the array of individual sensors can be configured to operate at low voltage (e.g., less than 5 volts). In many examples, a ground potential of the sense circuitry can be set to a high voltage during operation of the drive circuitry. In this manner, the low-voltage sense circuits of each individual sensor of the array of individual sensors can be isolated from the respective high voltage drive circuit. In many examples, each individual sensor of the array of individual sensors can share one or more electrodes. For example, in certain cases, the ground potential of each of the sense circuits can be applied by a shared electrode.

Some embodiments described herein take the form of method of operating an array of individual sensors associated with an acoustic imaging system, including at least the operations of increasing the voltage of a voltage source associated with a sense circuit of one or more individual sensors of an array of individual sensors, increasing the voltage of a ground reference associated with the sense circuit, and, thereafter, applying a high voltage activation signal to one or more piezoelectric elements associated with one or more individual sensors of the array of individual sensors.

Some embodiments described herein may relate to, include, or take the form of an acoustic imaging sensor including at least a high voltage node, a low voltage node, an acoustic element in communication with a bottom surface of a substrate, the acoustic element configured to produce an acoustic pulse into the substrate in response to an electronic activation pulse and including at least an ultrasonic transducer, a drive circuit configured to couple the ultrasonic transducer to the high voltage node in response to the electronic activation pulse, and a sense circuit coupled to the low voltage node and configured to obtain a low voltage electronic signal from the ultrasonic transducer. The acoustic imaging sensor can also include a controller configured to increase a voltage bias of the sense circuit when the drive circuit may be active. In this manner, low voltage circuitry can be safely isolated from high voltage circuitry.

Some embodiments described herein may relate to, include, or take the form of a method of driving an acoustic element with a high voltage drive circuit and a low voltage sense circuit, the method including at least the operations of increasing a voltage bias of the low voltage sense circuit (such that the potential difference between a voltage source of the low voltage sense circuit and a circuit ground of the low voltage sense circuit does not exceed a selected threshold) and applying a high voltage drive signal to an ultrasonic transducer coupled to the high voltage drive circuit. The selected threshold may be based, at least in part, on a maximum voltage and/or current of one or more components of the low voltage sense circuit. In this manner, low voltage circuitry can be safely isolated from high voltage circuitry.

Some embodiments described herein may relate to, include, or take the form of a method of reading an output of an acoustic element with a high voltage drive circuit and a low voltage sense circuit, the method including at least the operations of removing a voltage bias of the low voltage sense circuit (such that the potential difference between a voltage source of the low voltage sense circuit and a circuit ground of the low voltage sense circuit does not exceed a selected threshold), decreasing a voltage bias of the high voltage drive circuit (such that the potential difference between a voltage source of the high voltage drive circuit and a circuit ground of the high voltage drive circuit may be approximately zero volts), applying a reset voltage signal to the low voltage sense circuit, and measuring a voltage output from the low voltage sense circuit.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

Figure 1:
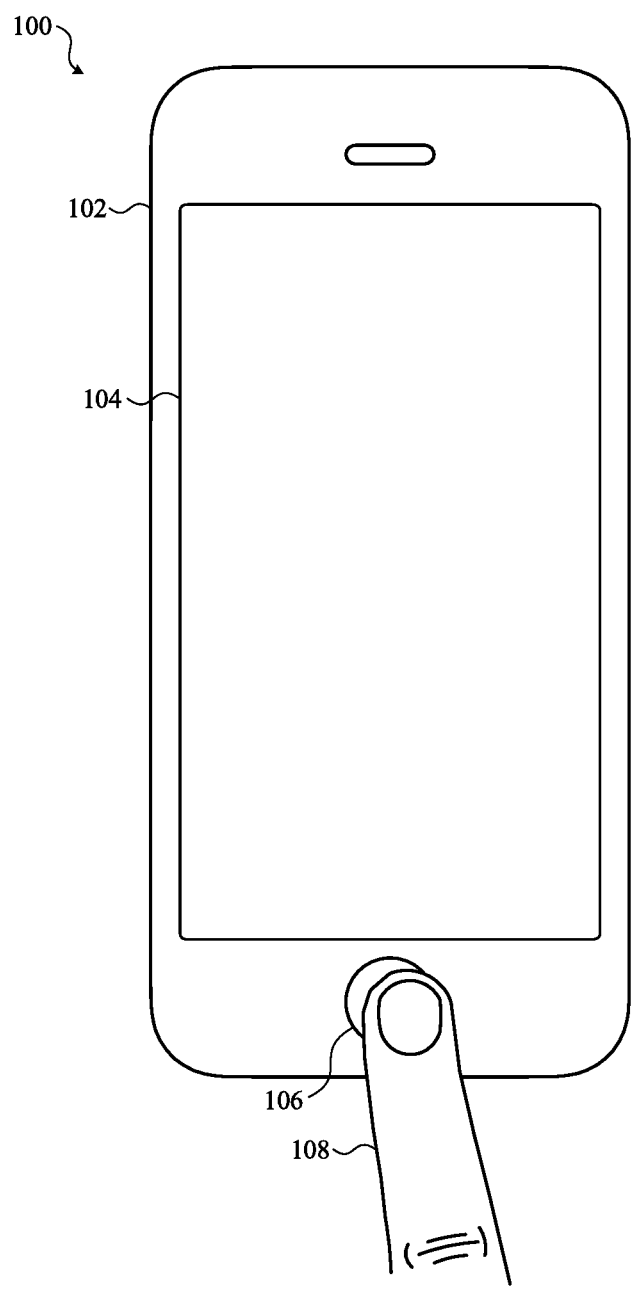
FIG. 1 depicts an example electronic device that can include an acoustic fingerprint imaging system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to methods and systems for operating acoustic fingerprint imaging systems. Although many embodiments are described herein with reference to fingerprint imaging systems for use with portable electronic devices, it should be appreciated that some embodiments can take other forms and may be included within different form factors. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to a particular embodiment to the exclusion of others.

Many acoustic imaging systems describe herein can include a substrate with two parallel surfaces such as a top surface and a bottom surface. An array of acoustic transducers can be arranged in a pattern and positioned near the bottom surface. To capture an image of an object engaging the top surface, the acoustic imaging system can cause the array to propagate an acoustic pulse (e.g., an "acoustic input" into the substrate) normal to the bottom surface and toward the object. When the acoustic pulse reaches the top surface of the substrate, a portion of the acoustic pulse may be reflected back towards the array of transducers. The reflection can be collected as an acoustic output from the substrate and an image of the top surface of the substrate can be approximated.

In many embodiments, an acoustic imaging system can implement the array of acoustic transducers as a number of individual ultrasonic elements formed from piezoelectric material such as lead zircanate titinate, zinc oxide, aluminum nitride, or any other piezoelectric material. Piezoelectric materials may be selected for the speed with which the materials can react to an electrical stimulus. In other words, piezoelectric materials can be selected for certain acoustic imaging systems requiring acoustic pulses of particularly high frequency (e.g., megahertz scale).

In these examples, to capture an image of an object engaging the top surface (e.g., fingertip, stylus tip, and so on), the imaging system can cause one or more piezoelectric elements to propagate an acoustic pulse (e.g., as a plane wave or as a localized pulse) normal to the bottom surface and toward the object in order to monitor for any acoustic signals reflected therefrom. This operation is referred to herein as "driving" the piezoelectric elements.

When the acoustic pulse reaches the top surface of the substrate, a portion of the acoustic pulse may be reflected normal to the top surface and back towards the piezoelectric elements as a result of the acoustic boundary (e.g., acoustic impedance mismatch) between the top surface and the portion of object engaging it. For example, a ridge of a fingerprint may present a different acoustic boundary when touching the substrate (e.g., soft tissue-substrate boundary) than a valley of a fingerprint (e.g., air-substrate boundary).

Accordingly, a ridge of a fingerprint may reflect the acoustic pulse differently than a valley of a fingerprint. In other words, a ridge of a fingerprint produces a different acoustic output than a valley of a fingerprint.

When the acoustic pulse returns to the piezoelectric elements, the elements can be used to capture the reflection as electrical signals. This operation is referred to herein as "sensing" with the piezoelectric elements. For example, when a piezoelectric element receives a portion of the acoustic reflection affected by a ridge of a fingerprint, that piezoelectric element may produce an electrical signal that is different than the electrical signal produced by a piezoelectric element receiving a reflection affected by a valley of a fingerprint.

By analyzing the electrical signals, the imaging system can derive an image of the object engaging the top surface of the substrate. For example, each electrical signal can correspond to one pixel of the subimage. In one embodiment, a pixel corresponding to an electrical signal affected by a ridge of a fingerprint may be lighter than a pixel corresponding to an electrical signal affected by a valley of a fingerprint.

However, in many embodiments, the operation of driving the one or more piezoelectric elements can have substantially different electrical requirements than the operation of sensing with the piezoelectric elements. For example, in many cases, a piezoelectric element is driven with a high voltage circuit (e.g., 0-100 volts) and is sensed with a low voltage circuit (e.g., 0-3.3 volts). In addition, piezoelectric materials typically have a high inherent capacitance. In many cases, driving piezoelectric materials at high frequencies (e.g., ultrasonic frequencies) with high voltage can induce current spikes (e.g., 1 amp or more) that can irreparably damage both high and low voltage circuit components. Furthermore, in many cases, low voltage circuit components can be irreparably damaged if exposed to a voltage beyond a certain designed threshold.

Furthermore, although increasing the number and reducing the size of transducers of an array can increase the potential resolution of an image derived therewith, smaller transducers may generate lower-amplitude signals that may be more sensitive to interference. In other cases, small transducers may be more susceptible to signal distortion from environmental conditions (e.g., temperature, pressure, humidity, and so on) than larger imaging sensors. Furthermore, signals obtained from individual transducers may traverse one or more lead lines and/or circuit traces as a result of which the signal may be attenuated and/or susceptible to additional interference.

Accordingly, embodiments described herein relate to high-resolution piezoelectric acoustic imaging systems having reduced interference sensitivity and having drive and sense circuitry tolerant to both high voltage and high current.

FIG. 1 depicts an example electronic device that can include an acoustic fingerprint imaging system such as a segmented imaging system and/or a progressive imaging system. In the present example, the electronic device 100 can be implemented as a portable electronic device such as a cellular phone. The electronic device 100 can include a housing 102 and a display 104. The display 104 can be disposed below a cover glass to protect the display 104 from damage. In many cases, the cover glass can be formed from an optically transparent and mechanically rigid material such as glass, sapphire, polycarbonate, and the like.

In many examples, the display 104 may include one or more of a variety of display elements. For example, the display 104 may include a liquid crystal display (LCD), a thin film transistor display (TFT), an organic light emitting diode display (OLED), organic electroluminescence (OEL) display, or other type of display. The display 104 may be used to present visual information to the user and may be operated in accordance with one or more display modes or the software applications being executed on the electronic device 100. In many cases, the display 104 can include or operate in conjunction with one or more touch input devices. For example, the display 104 may be configured to receive touch, gesture, and/or force input.

The electronic device 100 can also include one or more input elements such as a button 106. The button 106 may be a physical button such as a push button or switch. In other examples, the button 106 can be a touch input device that does not physically depress such as a capacitive button. In other cases, the button 106 can be a virtual button shown on the display 104.

In many embodiments, an acoustic fingerprint imaging system (not shown) can be positioned below a portion of the cover glass that may regularly receive a user's touch input. For example, the acoustic fingerprint imaging system can be positioned below the button 106. In this manner, each time the user 108 presses the button 106, the acoustic fingerprint imaging system can be activated. Once an image of fingerprint of the user 108 is obtained by the acoustic fingerprint imaging system, the obtained image can be compared to a database of known fingerprint images to determine if the obtained fingerprint image matches a known fingerprint image.

In some embodiments, the acoustic fingerprint imaging system can be positioned below the display 104. For example the acoustic fingerprint imaging system can be positioned below the display element associated with the display 104. In other examples, the acoustic fingerprint imaging system can be at least partially transparent and can be disposed above the display element associated with the display 104. In this manner, an image of a fingerprint may be obtained by touching any portion of the display 104.

In other examples, the acoustic fingerprint imaging system can be positioned within the sidewall of the housing 102. In this manner, when a user grips the electronic device 100, an image can be obtained of one or more fingerprints or palm prints of the user. In still further examples, more than one acoustic fingerprint imaging system can be included within the electronic device 100. For example, a first acoustic imaging system can be included below (or within) the button 106, and a second acoustic imaging system can be included below (or within) the display 104.

Figure 2A:
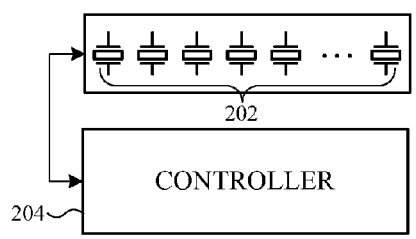
FIG. 2A depicts a simplified block diagram of an acoustic fingerprint imaging system.

FIG. 2A depicts a simplified block diagram of an acoustic fingerprint imaging system that can be used with the electronic device 100 of FIG. 1. The acoustic fingerprint imaging system 200 can include one or more acoustic transducers 202. The acoustic transducers 202 can contract or expand rapidly in response to an electrical stimulus such as a voltage or current (e.g., electroacoustic transducer). For example, the acoustic transducers 202 can be formed, in certain embodiments, from a piezoelectric material such as lead zirconate titinate, zinc oxide, aluminum nitride, or any other piezoelectric material. In other examples, the acoustic transducers 202 may be formed as a component configured to rapidly displace in response to an electrical stimulus such as a voltage or current (e.g., voice coil).

In many embodiments, the acoustic transducers 202 can be configured for both emitting and detecting acoustic signals. In other words, an acoustic transducer 202 can be used to both transmit an acoustic pulse in response to an electrical stimulus and, in addition, can generate an electrical signal in response to an acoustic output from the substrate.

Figure 2B:
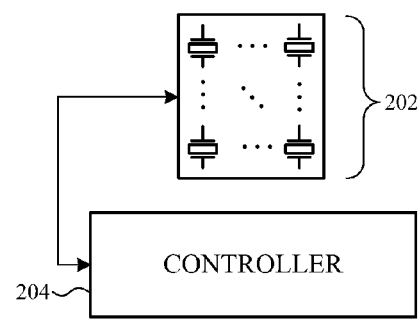
FIG. 2B depicts a simplified block diagram of another acoustic fingerprint imaging system.

In many examples, the acoustic transducers 202 can be arranged in a pattern. For example, in some embodiments the acoustic transducers 202 can be arranged in an evenly spaced line such as illustrated in FIG. 2A. In some embodiments, the acoustic transducers 202 can be arranged in a matrix or grid, as shown in FIG. 2B. In some examples, the matrix of the acoustic transducers 202 can be square or otherwise rectangular. In other examples, the matrix of the acoustic transducers 202 can take other shapes, such as a circular pattern (not shown).

Although many embodiments described herein distribute the acoustic transducers 202 in a uniform pattern (e.g., matrix, square, line, circle, and so on), such uniformity is not necessarily required.

The acoustic transducers 202 can be coupled to a controller 204. The controller 204 can be configured to provide electrical energy to each acoustic transducer 202 independently. For example, the controller 204 can provide a first voltage to a first transducer and a second voltage to a second transducer. In addition, the controller 204 can control the duration and magnitude of the electrical energy applied to each independent acoustic transducer 202.

In many examples, the controller 204 can operate in one or more modes. In certain embodiments, the controller 204 can have an interrogation mode. In other embodiments or implementations, the interrogation mode can be referred to as an integration mode or a drive mode. Accordingly, as used herein, terms and phrases such as "integration mode", "drive mode", and "interrogation mode" may be understood to each refer to the same operational mode of an acoustic fingerprint imaging system. When in the interrogation mode, the controller 204 can be configured to provide electrical energy to one or more of the acoustic transducers 202 and in response, the acoustic transducers 202 can produce an acoustic output. In many embodiments, the electrical energy provided by the controller 204 can be an abbreviated electrical pulse. In response to the abbreviated electrical pulse, the one or more acoustic transducers 202 can produce a punctuated acoustic output.

Figure 2C:
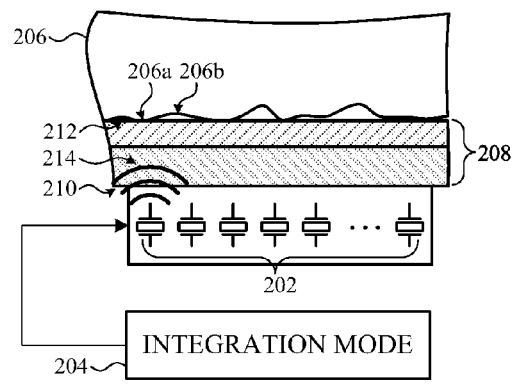
FIG. 2C depicts the acoustic fingerprint imaging system of FIG. 2A emitting an acoustic pulse toward an imaging surface.

In many embodiments, the acoustic imaging system 200 can be disposed within a housing of an electronic device. For example, FIG. 2C depicts the acoustic fingerprint imaging system of FIG. 2A positioned below one or more layers of a substrate 208. As illustrated, the substrate 208 can have a bottom surface 210 and a top surface 212. The bottom surface 210 can be oriented to face the acoustic transducers 202, and the top surface 212 can be oriented to receive a user's finger 206, illustrated in simplified cross-section showing various ridges 206a and valleys 206b of the user's fingerprint. Although the bottom surface 210 and top surface 212 are shown as parallel, such a configuration may not be required in all embodiments.

As noted with respect to FIG. 1, the substrate 208 can be a portion of a display, a portion of an input device (e.g., button, switch, and so on), or a portion of the housing of the electronic device. Although illustrated as two separate layers of material, many embodiments can implement the substrate 208 as a single layer of material, or more than two layers of material. The substrate 208 can include active components (e.g., circuits, circuit traces, batteries, and so on) or passive components (e.g., glass sheet, metal sheet, and so on) or a combination thereof.

For example, if for a selected embodiment, the substrate 208 is a portion of the housing of an electronic device, the substrate 208 can be formed from one or more layers of metal, glass, ceramic, plastic, and so on. In some embodiments, if the substrate 208 is a portion of a cover glass disposed above a display, the substrate 208 can be an optically transparent material such as glass, sapphire, plastic, and so on.

The acoustic transducers 202 can be positioned below the substrate 208 so as to be in acoustic communication with the bottom surface 210. In many examples, the acoustic transducers 202 are adhered to (or formed onto or into) the bottom surface 210. In this manner, when an acoustic transducer 202 generates an acoustic wave 214 in response to an activation signal from the interrogation-mode controller 204, the acoustic wave 214 can propagate into the substrate 208 from the bottom surface 210 toward the top surface 212.

Figure 2D:
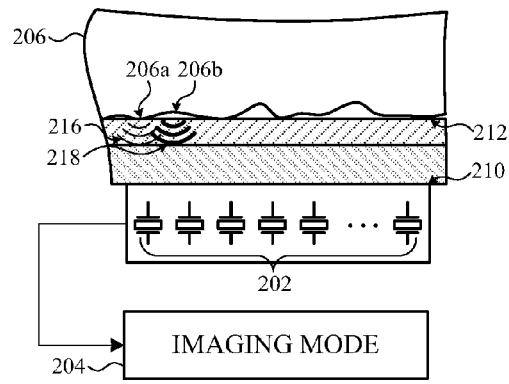
FIG. 2D depicts the acoustic fingerprint imaging system of FIG. 2A receiving an acoustic reflection from an imaging surface.

Once the acoustic wave 214 reaches the top surface 212, the controller 204 can transition into an imaging mode, such as depicted in FIG. 2D. When in the imaging mode, the controller 204 can be configured to receive and analyze an electrical signal from one or more of the acoustic transducers 202 that corresponds to an acoustic output of the substrate 208 resulting from a portion of a reflection of the acoustic wave 214 (see, e.g., FIG. 2C).

For example, in many embodiments, the acoustic reflection from a particular location along the top surface 212 may depend upon whether that location is below a ridge 206a or a valley 206b. More particularly, the acoustic boundary between the substrate 208 and a ridge 206a (having an acoustic impedance of soft tissue) may cause a measurably smaller-amplitude acoustic reflection than the acoustic boundary between the substrate 208 and a valley 206b (having an acoustic impedance of air).

For example, the percent $P_{diff}$ of amplitude of an acoustic reflection as a result of an acoustic boundary between two materials $M_1$ and $M_2$, having an acoustic impedance $Z_1$ and $Z_2$ respectively may be modeled as:

$$P_{diff} = \frac{\frac{Z_1}{Z_2} - 1}{\frac{Z_1}{Z_2} + 1} \qquad \text{Equation 1}$$

In this example, if the acoustic impedances $Z_1$ and $Z_2$ of the two materials are substantially equal, the amplitude of any acoustic reflection is minimal or zero. On the other hand, if one of the two acoustic impedances $Z_1$ or $Z_2$ is larger than the other, $P_{diff}$ approaches ±1.0. In many examples, the direction of the wave (e.g., from high impedance to low impedance medium or the reverse) can determine whether the amplitude will be inverted upon reflection.

As noted above, the amplitude of a reflection from a ridge-substrate acoustic boundary may be a smaller than the amplitude of a reflection from a valley-substrate acoustic boundary. In other words, the amplitude of an acoustic reflection 216 from an area of the top surface 212 that is below a ridge 206a may be less than the amplitude of an acoustic reflection 218 from an area of the top surface 212 that is below a valley 206b. Accordingly, the controller 204, when in an imaging mode, can monitor the amplitude of an acoustic reflection to derive, determine, assemble, or create, an image of the ridges and valleys of a user's fingerprint.

Figure 3A:
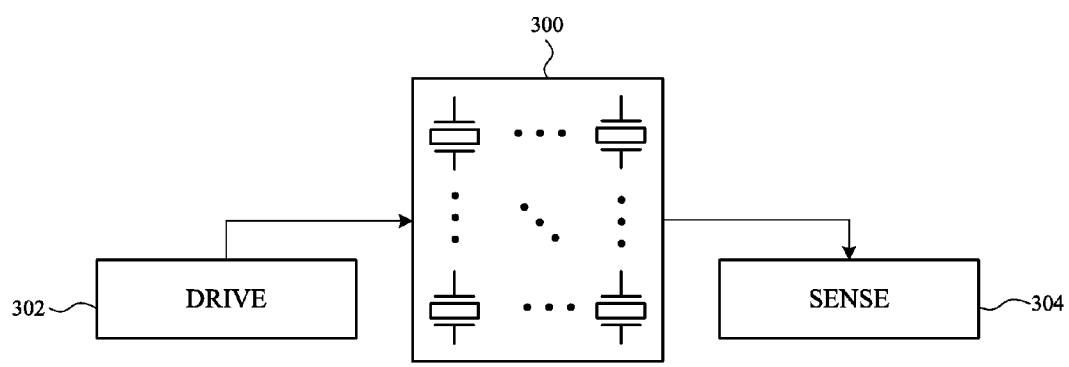
FIG. 3A depicts a simplified block diagram of an acoustic fingerprint imaging system having both high voltage and low voltage modes of operation.

FIG. 3A depicts a simplified block diagram of an acoustic fingerprint imaging system having both high voltage and low voltage modes of operation. An acoustic transducer array 300 can include two or more acoustic transducers. For example, in some embodiments the acoustic transducer array 300 can include an N×M array of individual transducers.

Coupled to the acoustic transducer array 300 can be a drive controller 302. The driver controller 302 can be configured to deliver a high voltage (e.g., 100 volts) to one or more transducers of the acoustic transducer array 300. In some cases, the drive controller 302 can be implemented as a plurality of drive controllers 302. For example, in such an embodiment, each individual transducer of the array of acoustic transducers 300 can be coupled to a respective one drive controller 302. In another example, a single drive controller 302 can be coupled to a subset or subarray of acoustic transducers of the array of acoustic transducers 300. In these and related embodiments, adjacent transducers (and/or all transducers of the acoustic transducer array 300) can share one or more electrodes associated with the drive controller 302.

Coupled to the acoustic transducer array 300 can be a sense controller 304. The sense controller 304 can be configured to receive a low voltage (e.g., 0-3.3 volts) signal from one or more transducers of the acoustic transducer array 300. As with the drive controller 302, in some cases, the sense controller 304 can be implemented as a plurality of sense controllers 304. For example, in such an embodiment, each individual transducer of the array of acoustic transducers 300 can be coupled to a respective one sense controller 304. In another example, a single sense controller 304 can be coupled to a subset or subarray of acoustic transducers of the array of acoustic transducers 300. In these and related embodiments, adjacent transducers (and/or all transducers of the acoustic transducer array 300) can share one or more electrodes associated with the sense controller 304.

Figure 3B:
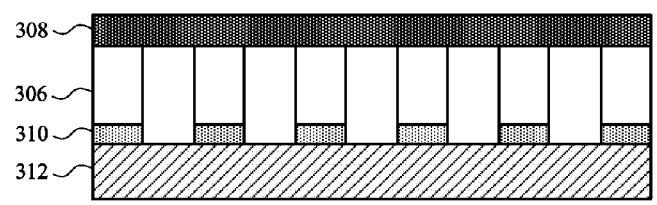
FIG. 3B depicts a simplified diagram of an acoustic fingerprint imaging system showing a series of individually addressable acoustic transducers.

FIG. 3B depicts a simplified cross-section diagram of an acoustic fingerprint imaging system showing a series of acoustic transducers sharing one or more electrodes. Depicted are six independent transducers 306 that can share a shared electrode 308. In certain embodiments, the shared electrode 308 can be a ground electrode, although this configuration is not required and can be, in certain embodiments, a voltage and/or power supply electrode. As illustrated, each of the independent transducers 306 are electrically coupled to the shared electrode 308. In some embodiments, the independent transducers 306 can be coupled to the shared electrode 308 by soldering. In some embodiments, the shared electrode 308 can be formed, layered, or otherwise disposed atop the independent transducers 306 in a manufacturing process.

In further embodiments, the independent transducers 306 can be coupled to the shared electrode 308 by an electrically conductive adhesive.

Positioned below the independent transducers 306 can be a series of individual electrodes 310 that can couple the independent transducers 306 to a sense/drive chip 312. The sense/drive chip 312 can be configured for both high voltage driving of the independent transducers 306 and low voltage sensing of the independent transducers 306.

For example, when operating in a drive mode, the sense/drive chip 312 can provide a high voltage (e.g., 100 volts) signal to one or more of the independent electrodes 310 which can, in turn, excite the respective one or more independent transducers 306. In this mode, the largest potential difference between the sense/drive chip 312 and the shared electrode 308 can be can be a high voltage such as 100 volts.

Conversely, when operating in a sense mode, the sense/drive chip 312 can receive a low-voltage signal from one or more of the independent electrodes 310 corresponding to an electrical signal produced by the respective one or more individual transducers 306. In this mode, the largest potential difference between the sense/drive chip 312 and the shared electrode 308 can be can be a low voltage such as 0-3.3 volts.

In order to prevent any of the low-voltage circuits of the sense/drive chip 312 from being damaged by the high voltage required of the high voltage circuitry, the sense/drive chip 312 can shift the ground potential of all low-voltage circuit components prior to driving such that the maximum potential difference through any low-voltage circuit component is below that component's maximum voltage tolerance.

In one example, the sense/drive chip 312 can set the potential of the ground of the low-voltage components to 100 volts and the potential of the voltage source (e.g., Vcc) of the low-voltage components to 103.3 volts. In this manner, the low-voltage components may experience a potential difference of only 3.3 volts, despite the fact that 100 volts may be applied across one or more independent transducers 306.

In many cases, the sense/drive chip 312 can include one or more sense and drive circuits devoted to each independent transducer 306. In this manner, each of the acoustic transducers 306 can be "active sensors" of the acoustic imaging sensor while operating in both a drive mode and while operating in a sense mode. Conversely, certain embodiments may not include independent sense circuitry for each independent transducer 306. Such embodiments are referred to herein as "passive sensors" of an acoustic imaging sensor.

Figure 4A:
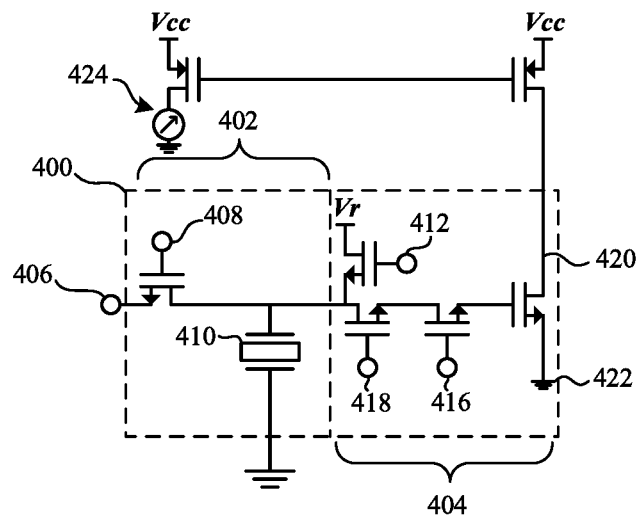
FIG. 4A depicts a simplified schematic diagram of an acoustic sensor configured to operate in both high voltage and low voltage modes.

FIG. 4A depicts a simplified schematic diagram of an active acoustic sensor configured to operate in a drive and a sense mode independent of other individual sensors within an array (e.g., one-dimensional row) of active acoustic sensors. As a result, driving and sensing with the active acoustic sensor may be more power efficient than conventional implementations that may simultaneously drive or sense with entire rows or columns of acoustic sensors. As may be appreciated, these conventional row-wise drive and sense configurations may also generate substantial capacitance In the illustrated embodiment, the active acoustic sensor can be configured to operate in both high voltage and low voltage modes although this is not necessarily required and other embodiments may have different voltage requirements or configurations. In the illustrated embodiment, a high voltage mode may be associated with a drive operation and a low voltage mode may be associated with a sense operation. In many cases, two modes may be required as a result of the high voltage required to operate a particular acoustic transducer in a drive mode and the low voltage output from that same transducer when operating in the sense mode.

As illustrated, the active acoustic sensor 400 can include a high voltage portion 402 and a low voltage portion 404. In these embodiments, transistors and/or other components associated with the high voltage portion 402 can be manufactured to tolerate and/or operate in high voltage conditions. Similarly, transistors and/or other components associated with the low voltage portion 404 can be manufactured to tolerate and/or operate in lower voltage conditions.

The high voltage portion 402 can be configured to receive a high voltage signal from a voltage source, for example shown as a buffer 406. The buffer 406 can be implemented in any number of suitable ways, such as with a back-to-back inverter pair. In some cases, each active acoustic sensor of an array of active acoustic sensors can be associated with one respective buffer 406. In other words, each acoustic sensor can have a dedicated voltage buffer 406 associated therewith. In other embodiments, a single buffer 406 can be associated with a subset of active acoustic sensors within an array of acoustic sensors. In other embodiments, other buffer connection topologies can be implemented.

Voltage output from the buffer 406 can be selectively enabled and/or disabled by a high voltage control switch 408, illustrated as an NMOS. One may appreciate that although illustrated as an NMOS, the high voltage control switch 408 can be implemented in other ways. For example, in certain embodiments a PMOS may be used. When the high voltage control switch 408 is enabled, the high voltage signal ("drive signal") can pass into a transducer 410. In response, the transducer 410 can generate an acoustic output corresponding to the high voltage signal.

In many embodiments, the high voltage signal can be a constant voltage signal. In other examples, the high voltage signal can be a varying voltage signal. In still further examples, the high voltage signal can be an alternating current signal.

In many embodiments, the high voltage signal may be selected so that the high voltage signal terminates with zero volts.

The active acoustic sensor 400 can also include a low voltage portion 404. The low voltage portion 404 can include a voltage-reset controller 412 that may also be coupled to the transducer 410. The voltage-reset controller 412 can be implemented as a single switch (as illustrated). When enabled, the voltage-reset controller 412 can set the voltage across the transducer 410 (and, correspondingly, and nodes electrically connected to the output of the voltage-reset controller 412) to a defined reset voltage Vr. In some examples, the defined reset voltage Vr can be zero volts. In other embodiments, other reset voltages can be used. In some embodiments, the high voltage signal may be selected so that the high voltage signal terminates at the reset voltage.

The low voltage portion 404 can also include a row and column selection switches 416, 418 (respectively). As noted above, the active acoustic sensor 400 can be one of many individual sensors defining an acoustic imaging array. Accordingly, the row and column selection switches 416, 418 can be used in order to independently address a particular individual sensor from the array of many individual sensors. The row and column selection switches 416, 418 can be arranged in series such that both the row switch 416 and the column switch 418 must be enabled for a signal to be read from the active acoustic sensor 400.

The row switch 416 and the column switch 418 can also be coupled, at one end, to the voltage-reset controller 412. In this manner, when the voltage-reset controller is enabled, the reset voltage Vr can pass through both the row switch 416 and column switch 418 to set the voltage of the gate of a sensing amplifier 420. The sensing amplifier 420 can be implemented as any type of controllable gain or fixed gain amplifier. For example, as illustrated, the sensing amplifier 420 is implemented as a common source amplifier, although this configuration is not required and other amplifier topologies are possible. In further embodiments, the row and column selection switches 416, 418 can also be implemented as a type of controllable gain or fixed gain amplifier. Still further embodiments can include different amplification topologies.

The output from the sensing amplifier 420 can thereafter be read by the acoustic imaging system as a signal corresponding to the present acoustic signals received by the transducer 410. As one example, when the transducer 410 receives an acoustic signal (e.g., from an acoustic reflection), the transducer 410 can generate a voltage bias across its terminals. This voltage can thereafter be amplified by the sensing amplifier 420.

In some embodiments, the output voltage of the sensing amplifier 420 can be biased. For example, an output biasing circuit 424 can be used to supply the output of the sensing amplifier with a direct current bias.

In many embodiments, the high voltage portion 402 can be entirely disabled while the low voltage portion 404 is operating. As one example, the high voltage portion can be shorted (e.g., Vcc set to the same potential as ground). In this manner, while the low voltage portion 404 is sensing and amplifying any electrical signals from the transducer 410, the high voltage portion 402 does not present as a load to the low voltage portion 404.

Similarly, the low voltage portion 402 can be disabled while the high voltage portion 402 is operating. As noted above, portions of the low voltage portion 402 (e.g., row and column selection switches 416, 418, amplifier 420) can be damaged by any high voltage signals. Accordingly, in many embodiments, before the high voltage portion 402 begins operating, the voltage source and ground reference 422 of the low voltage portion can be raised.

For example, if the high voltage portion 402 is configured to send a 100 Volt pulse into the transducer 410, the ground reference 422 of the low voltage portion 404 can be set to be 100 Volts. Correspondingly, the voltage source Vcc of the low voltage portion 404 can be set to 100 Volts. In some embodiments, the voltage source Vcc can be set slightly higher than 100 Volts to provide a slight voltage range buffer. In this manner, when Vcc and the ground reference 422 are set to 100+ Volts and 100 Volts respectively, the potential difference across all components of the low voltage portion 404 is small enough to be within the voltage tolerance of the low voltage portion 404. For example, in some embodiments Vcc of the low-voltage portion 404 can be set to 103.3 Volts and the ground reference 422 can be set to 100 V. In this manner, the voltage difference across the sensing amplifier 422 can be 3.3 Volts.

Certain embodiments can set the potential of the voltage sources (Vcc) and ground references (GND) of the high voltage and low voltage portions in the manner such as shown in TABLE 1, below:

TABLE 1

|  | Sense Mode | Drive Mode |
| --- | --- | --- |
| Vcc (High Voltage) | 0 Volts | 100 Volts |
| Vcc (Low Voltage) | 3.3 Volts | 103.3 Volts |
| GND (High Voltage) | 0 Volts | 0 Volts |
| GND (Low Voltage) | 0 Volts | 100 Volts |

Figure 4B:
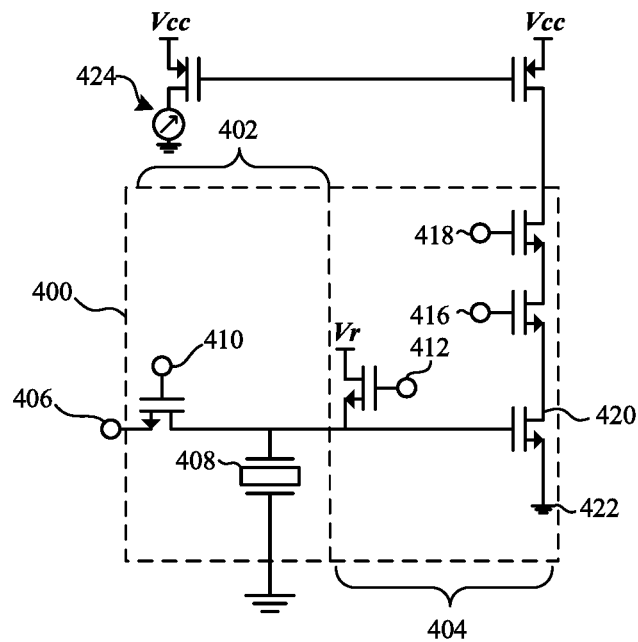
FIG. 4B depicts another simplified schematic diagram of an acoustic sensor configured to operate in both high voltage and low voltage modes.

FIG. 4B depicts another simplified schematic diagram of an acoustic sensor configured to operate in both high voltage and low voltage modes. In this embodiment, the row and column select switches 416, 418 can be re-positioned to be coupled to the source of the NMOS common drain sensing amplifier 420. In one example, the active acoustic sensor depicted in FIG. 4B may be used with a two-dimensional acoustic sensor array.

Figure 5:
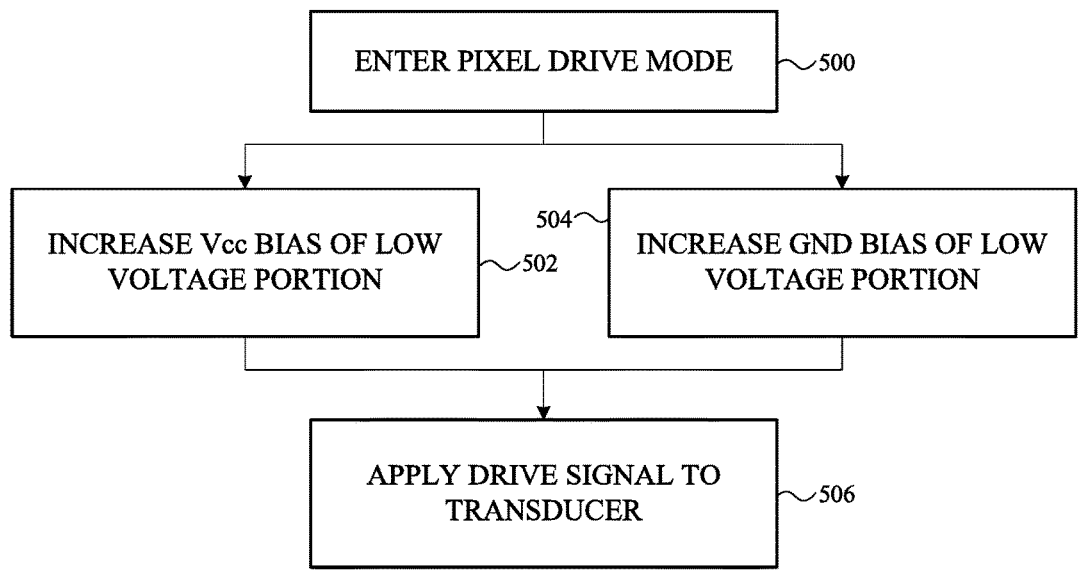
FIG. 5 depicts example operations of a method of driving an acoustic sensor having both high voltage and low voltage modes of operation.

FIG. 5 depicts example operations of a method of driving an acoustic sensor having both high voltage and low voltage modes of operation. The method can begin at operation 500 in which an individual sensor drive mode can be enabled for a particular acoustic sensor. Thereafter, at operation 502, the Vcc bias of a low voltage portion of the acoustic sensor can be increased and, at substantially the same time, at operation 504, the ground reference (e.g., GND) bias can be increased as well. As may be appreciated, the operations of increasing the Vcc bias of a low voltage portion of the acoustic sensor and increasing the ground bias of the same acoustic sensor should occur at substantially the same time. For example, if the Vcc bias is increased prior to increasing the ground reference of the low voltage portion, damage to low voltage circuitry may occur. In some embodiments, the ground reference can be increased to a smaller voltage than that of the Vcc bias of operation 502. For example, the Vcc bias may be increased to 103.3 volts while the ground reference bias is increased to 100.0 volts. Thereafter at operation 506, a high voltage drive signal can be applied to a transducer associated with the individual sensor.

Figure 6:
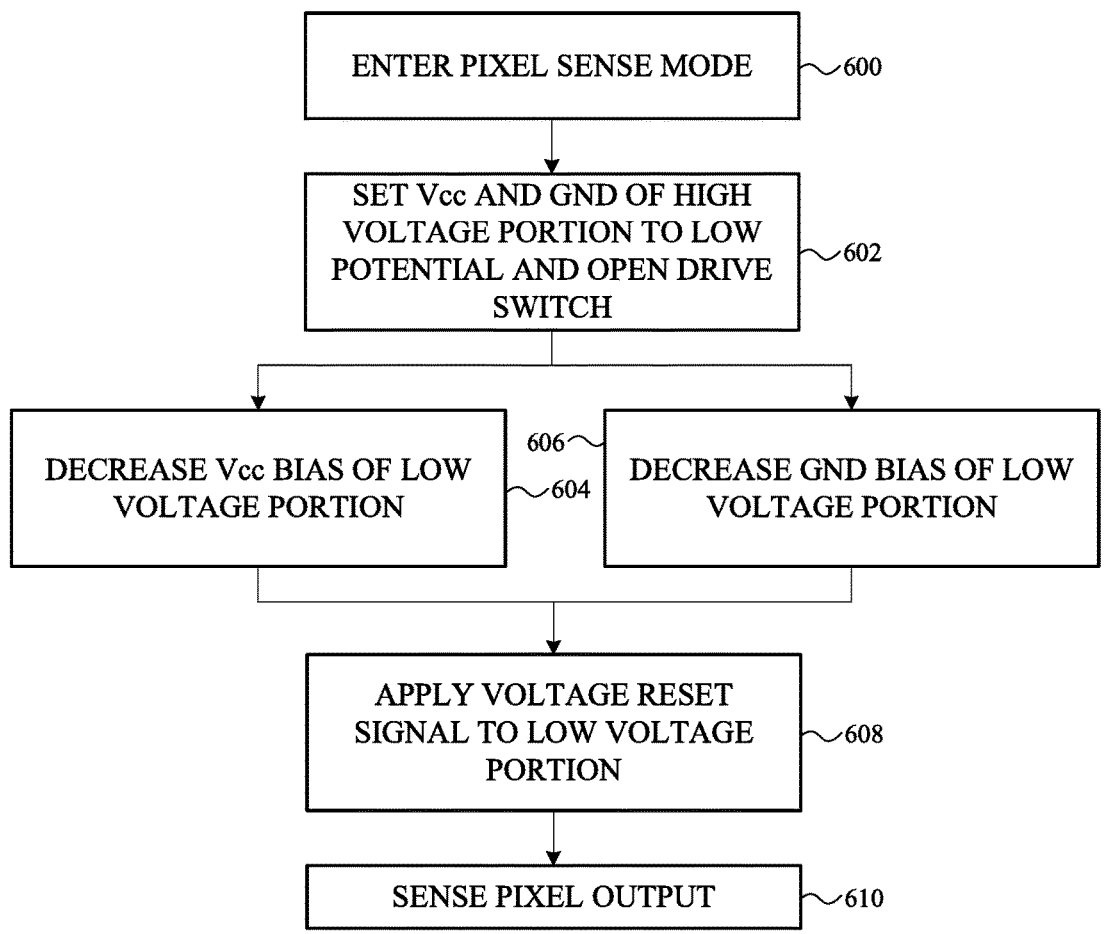
FIG. 6 depicts example operations of a method of sensing acoustic signals with an acoustic sensor having both high voltage and low voltage modes of operation.

FIG. 6 depicts example operations of a method of sensing acoustic signals with an acoustic sensor having both high voltage and low voltage modes of operation. The method can begin at operation 600 in which a sense mode can be enabled for a particular acoustic sensor. Thereafter at operation 602, the Vcc bias of a high voltage portion of the acoustic sensor and a ground reference portion of the acoustic sensor can be set to the same potential. Thereafter, at operation 604, the Vcc bias of a low voltage portion of the acoustic sensor can be decreased and, at substantially the same time, at operation 606, the ground reference (e.g., GND) bias can be decreased as well. In some embodiments, the potential at operation 602 can be 0 Volts. Thereafter, at operation 608, a voltage reset signal can be applied to the low voltage portion. Finally, at operation 610, the output of the acoustic sensor can be sensed.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An acoustic imaging sensor comprising:
 a piezoelectric element operable in a drive mode and a sense mode;
 a sense circuit coupled to the piezoelectric element and configured to obtain a voltage signal from the piezoelectric element when in the sense mode, the voltage signal corresponding to at least a portion of a pixel of an acoustic image; and
 a ground-shifting controller configured to increase a ground and a source of the sense circuit approximately to a drive voltage when in the drive mode.

2. The acoustic imaging sensor of claim 1, further comprising:
 a drive voltage node; and
 a drive circuit configured to couple the piezoelectric element to the drive voltage node when in the drive mode.

3. The acoustic imaging sensor of claim 2, wherein the ground-shifting controller is configured to connect the drive voltage node to a system ground when in the sense mode.

4. The acoustic imaging sensor of claim 2, wherein the drive voltage node is coupled to a high voltage source.

5. The acoustic imaging sensor of claim 2, wherein the sense circuit is coupled to a low voltage source.

6. The acoustic imaging sensor of claim 1, wherein:
 the piezoelectric element is a first piezoelectric element; and the acoustic imaging sensor further comprises:
an array of piezoelectric elements, including the first piezoelectric element, coupled to an interior surface of a substrate.

7. The acoustic imaging sensor of claim 6, wherein the array of piezoelectric elements is configured to capture an image of a fingerprint in contact with an exterior surface of the substrate.

8. The acoustic imaging sensor of claim 7, wherein the substrate is formed from one of the group consisting of glass, plastic, sapphire, and metal.

9. The acoustic imaging sensor of claim 1, wherein the piezoelectric element is positioned below a display.

10. The acoustic imaging sensor of claim 1, wherein the piezoelectric element is positioned below a button.

11. The acoustic imaging sensor of claim 1, wherein the piezoelectric element comprises a lead-free piezoelectric material.

12. A method of operating an acoustic sensor element in a drive mode, the method comprising:
increasing a ground of a low-voltage sense circuit coupled to the acoustic sensor element to a voltage approximately equal to a high-voltage drive signal;
increasing a source of the low-voltage sense circuit such that a potential difference between the source and the ground of the low-voltage sense circuit does not exceed a selected low-voltage threshold; and
after increasing the ground and source of the low-voltage sense circuit, applying the high-voltage drive signal to the acoustic sensor element.

13. The method of claim 12, wherein the high-voltage drive signal has a sinusoidal waveform.

14. The method of claim 12, further comprising increasing the source of the low-voltage sense circuit above the ground.

15. The method of claim 12, wherein the ground and source are biased to the same voltage.

16. The method of claim 12, wherein when the acoustic sensor element is in a sense mode, the method comprises:
decreasing the ground of the low-voltage sense circuit to a system ground; and
decreasing the source of the low-voltage sense circuit to a voltage above the system ground such that a potential difference between the source and the ground of the low-voltage sense circuit does not exceed a selected threshold.

17. A method of operating an acoustic imaging sensor, the method comprising:
operating in a drive mode by:
increasing a ground of a low-voltage sense circuit coupled to an acoustic sensor element array to a voltage approximately equal to a high-voltage drive signal;
increasing a source of the low-voltage sense circuit such that a potential difference between the source and the ground of the low-voltage sense circuit does not exceed a selected threshold; and
applying the high-voltage drive signal to at least one acoustic sensor element of the acoustic sensor element array; and
operating in a sense mode, after applying the high-voltage drive signal to the at least one acoustic sensor element, by:
decreasing the ground of the low-voltage sense circuit;
decreasing the source of the low-voltage sense circuit such that the potential difference between the source and the ground does not exceed the selected threshold; and
obtaining at least one voltage signal from the at least one acoustic sensor element.

18. The method of claim 17, further comprising amplifying the at least one voltage signal.

19. The method of claim 18, further comprising correlating the at least one voltage signal to at least one pixel of an output image.

20. The method of claim 18, wherein:
the high-voltage drive signal is generated by a drive circuit; and
the method further comprising, in the sense mode, grounding a voltage supply line of the drive circuit.

* * * * *